US010220741B2

(12) United States Patent
Sekino et al.

(10) Patent No.: US 10,220,741 B2
(45) Date of Patent: Mar. 5, 2019

(54) VEHICLE SEAT

(71) Applicant: TACHI-S CO., LTD., Tokyo (JP)

(72) Inventors: Hiroshi Sekino, Tokyo (JP); Yukihito Kobayashi, Tokyo (JP); Norio Endou, Tokyo (JP); Takahiro Kikuchi, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/493,766

(22) Filed: Apr. 21, 2017

(65) Prior Publication Data

US 2017/0305317 A1    Oct. 26, 2017

(30) Foreign Application Priority Data

Apr. 26, 2016    (JP) .................................. 2016-088336

(51) Int. Cl.
*B60N 2/58*    (2006.01)
*B60N 2/60*    (2006.01)

(52) U.S. Cl.
CPC ............. *B60N 2/5883* (2013.01); *B60N 2/58* (2013.01); *B60N 2/6009* (2013.01)

(58) Field of Classification Search
CPC ....... B60N 2/58; B60N 2/5883; B60N 2/6009
USPC ......... 297/218.1, 218.2, 218.3, 218.4, 218.5, 297/452.38
See application file for complete search history.

(56) References Cited

U.S. PATENT DOCUMENTS

| | | | | |
|---|---|---|---|---|
| 3,601,446 A | * | 8/1971 | Persson ................ | A47C 31/023 297/405 |
| 3,614,155 A | * | 10/1971 | Campbell .............. | A47C 13/00 297/129 |
| 3,657,750 A | * | 4/1972 | Staley ................... | A47C 31/11 297/219.1 |
| 3,675,970 A | * | 7/1972 | Bereday ................ | A47C 7/185 297/452.24 |
| 3,747,178 A | * | 7/1973 | Harder, Jr. ............. | B60N 2/70 297/218.3 X |
| 3,794,378 A | * | 2/1974 | Haslam ................ | B60N 2/5825 297/452.6 |
| 3,818,520 A | * | 6/1974 | Richards, Jr. ........ | A47C 31/001 297/DIG. 5 |
| 3,818,521 A | * | 6/1974 | Richards, Jr. ........ | A47C 31/001 297/DIG. 5 |

(Continued)

FOREIGN PATENT DOCUMENTS

| | | |
|---|---|---|
| CN | 102368925 A | 3/2012 |
| EP | 1 092 586 A2 | 4/2001 |

(Continued)

OTHER PUBLICATIONS

Chinese Office Action, dated Nov. 8, 2018, for Chinese Application No. 201710283047.7, 10 pages. (with English Machine Translation).

*Primary Examiner* — Rodney B White
(74) *Attorney, Agent, or Firm* — Seed IP Law Group LLP

(57) ABSTRACT

A vehicle seat includes: a trim cover including: a plurality of surface materials joined each other; a core material; a welt surface material wrapping the core material; a welt provided along a seam of two pieces of joined surface materials; and an empty core part provided with the welt, the empty core part reaching one end of the welt; and a seat element overlapped on the empty core part.

3 Claims, 5 Drawing Sheets

(56) References Cited

U.S. PATENT DOCUMENTS

| | | | | |
|---|---|---|---|---|
| 3,924,893 A | * | 12/1975 | Ferrara | B60N 2/5621 297/452.34 |
| 3,981,534 A | * | 9/1976 | Wilton | A47C 7/185 297/218.1 |
| 4,018,479 A | * | 4/1977 | Ball | A47C 7/185 297/239 |
| 4,089,497 A | * | 5/1978 | Miller | A47B 95/043 297/218.4 X |
| 4,106,739 A | * | 8/1978 | Gasser | A47C 31/00 248/345.1 |
| 4,370,002 A | * | 1/1983 | Koepke | A47C 31/023 297/218.1 |
| 4,385,783 A | * | 5/1983 | Stephens | A47C 1/03 297/353 |
| 4,457,032 A | * | 7/1984 | Clarke | B60N 2/60 297/219.1 |
| 4,463,464 A | * | 8/1984 | Bost | A47C 7/24 297/452.61 |
| 4,558,904 A | * | 12/1985 | Schultz | A47C 5/06 297/218.5 X |
| 4,579,383 A | * | 4/1986 | Colby | A47C 4/283 297/411.42 |
| 4,579,388 A | * | 4/1986 | Urai | B60N 2/58 297/452.26 |
| 4,619,725 A | * | 10/1986 | Muraishi | B29C 63/22 156/182 |
| 4,625,350 A | * | 12/1986 | Urai | B29C 65/04 156/155 |
| 4,650,251 A | * | 3/1987 | Shimada | A47C 31/00 156/73.1 |
| 4,660,888 A | * | 4/1987 | Urai | A47C 31/11 297/218.4 |
| 4,710,992 A | * | 12/1987 | Falwell | A47C 27/085 24/545 |
| 4,740,034 A | * | 4/1988 | Snyder | A47C 9/00 297/452.59 X |
| 4,789,201 A | * | 12/1988 | Selbert | B60N 2/5825 297/218.1 |
| 4,867,508 A | * | 9/1989 | Urai | B29D 99/0092 297/452.61 |
| 5,102,191 A | * | 4/1992 | Peng | A47C 7/021 297/218.5 |
| 5,118,162 A | * | 6/1992 | Saul | A47B 95/043 248/345.1 |
| 5,248,186 A | * | 9/1993 | Steinfeld | A47C 31/00 248/345.1 |
| 5,338,091 A | * | 8/1994 | Miller | A47C 5/06 297/218.4 |
| 5,860,673 A | * | 1/1999 | Hasegawa | B60R 21/207 280/728.3 |
| 6,102,482 A | * | 8/2000 | Dettoni | A47C 7/16 297/440.11 |
| 6,848,744 B1 | * | 2/2005 | Raftery | A47C 31/02 297/284.1 |
| 7,052,083 B2 | * | 5/2006 | Peitz | A47C 7/00 297/183.1 |
| 7,458,642 B1 | * | 12/2008 | Spicer | A47C 7/282 29/91.1 |
| 8,152,235 B2 | * | 4/2012 | McElmurry | A47C 31/023 297/218.1 X |
| 8,191,218 B2 | * | 6/2012 | Dooley | B60N 2/58 29/91.1 |
| 8,336,963 B1 | * | 12/2012 | DeMonaco | B60N 2/787 297/411.23 |
| 2006/0001303 A1 | * | 1/2006 | Raftery | A47C 1/03 297/284.2 |
| 2006/0214484 A1 | * | 9/2006 | Zaharakos | A47C 31/11 297/218.1 |
| 2007/0257531 A1 | * | 11/2007 | Mashimo | B60N 2/5825 297/218.3 |
| 2012/0133194 A1 | | 5/2012 | Takehara et al. | |

FOREIGN PATENT DOCUMENTS

| | | |
|---|---|---|
| JP | 3-24160 Y2 | 5/1991 |
| JP | 10-35393 A | 2/1998 |

* cited by examiner

VEHICLE SEAT

CROSS-REFERENCE TO RELATED APPLICATION(S)

This application is based upon and claims the benefit of priority from Japanese Patent Application No. 2016-088336, filed on Apr. 26, 2016, the entire contents of which are incorporated herein by reference.

BACKGROUND

1. Field of the Invention

The present invention relates to a vehicle seat.

2. Description of the Related Art

A vehicle seat typically includes a cushioning pad and a trim cover that covers the cushioning pad, and the trim cover is made by joining a plurality of surface materials. From a view of improving the design of the seat, a welt may be provided along the seam of two pieces of surface materials which are joined (for example, refers to JP-UM-Y-H03-24160). The welt includes a core material and a welt surface material which wraps the core material, and the core material is typically provided along the full length of the welt.

To hide mechanical parts such as a reclining mechanism or a seat sliding mechanism that expose at the side of a seat cushion, the side of the seat cushion is covered by a side finish made of synthetic resin. The side finish may be overlapped on a welt provided along a seam of a surface material which forms a bearing surface of the seat cushion and a surface material which forms a side surface of the seat cushion. In this case, the welt separates from the side finish as a passenger sits down, and the welt contacts the side finish as the passenger leaves. When the separation and the contact are repeated, a tear may occur at the welt surface material that wraps the core material of the welt, and the appearance quality of the seat may be spoiled.

SUMMARY

The present invention is made in view of the above circumstances, and the object of the present invention is to prevent a tear of a welt surface material which wraps a core material of the welt, and to improve the appearance quality of a vehicle seat.

According to an aspect of the present invention, there is provided a vehicle seat including: a trim cover including: a plurality of surface materials joined each other; a core material; a welt surface material wrapping the core material; a welt provided along a seam of two pieces of joined surface materials; and an empty core part provided with the welt, the empty core part reaching one end of the welt; and a seat element overlapped on the empty core part.

According to the present invention, a tear of a welt surface material which wraps a core material of the welt can be prevented, and the appearance quality of a vehicle seat can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
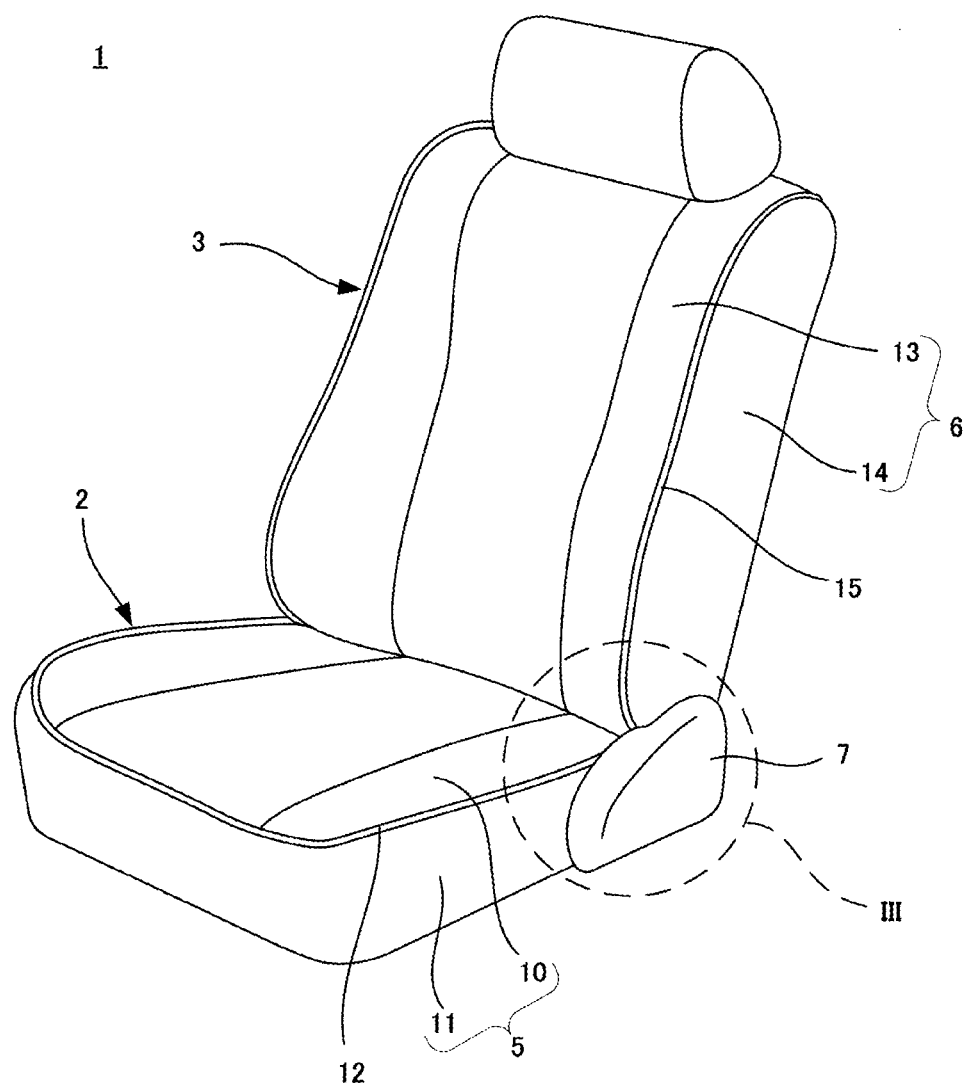
FIG. 1 is a perspective view of a vehicle seat example to describe an embodiment of the present invention.

FIG. 1 shows an example of the vehicle seat to describe an embodiment of the present invention.

A vehicle seat 1 shown in FIG. 1 includes a seat cushion 2 that forms a bearing portion, and a seat pack 3 that forms a back portion. The seat cushion 2 and the seat pack 3 have a cushioning pad made of foams such as urethane foam, and a frame which supports the cushioning pad, respectively. The cushioning pad of the seat cushion 2 is covered by a trim cover 5, and the cushioning pad of the seat pack 3 is covered by a trim cover 6.

The trim covers 5, 6 are made by joining a plurality of surface materials, and, for example, leather (natural leather, synthetic leather) or cloth (textile, knitting, nonwoven fabric) are used as the surface materials. The surface material may have a single-layered structure of leather or cloth, and may have a multilayer structure in which a wadding (for example, resin foam such as elastically deformable flexible polyurethane foam) is laminated on leather or cloth as an outer material. The trim cover 5, 6 may be formed of one kind of surface material, and may be formed of a plurality of different surface materials at different positions.

The trim cover 5 of the seat cushion 2 is provided with a welt 12 along the seam of a surface material 10 that forms the bearing surface of the seat cushion 2 and a surface material 11 that forms the side surfaces of the seat cushion 2. Further, the trim cover 6 of the seat pack 3 is provided with a welt 15 along the seam of a surface material 13 that forms a back surface of the seat pack 3 and a surface material 14 that forms the side surfaces of the seat pack 3.

Figure 2:
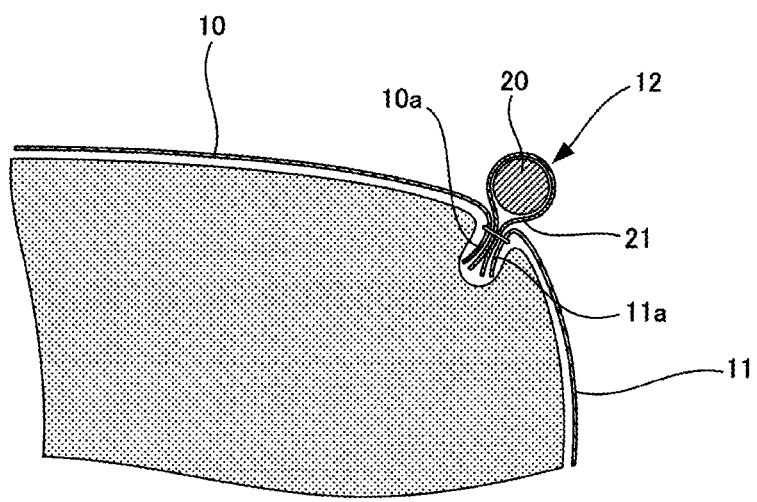
FIG. 2 is a sectional view of a welt of a trim cover of FIG. 1.

FIG. 2 shows a schematic configuration of the welt 12 of the trim cover 5.

The welt 12 includes a core material 20, and a welt surface material 21 that wraps the core material 20. For example, resin cord or paper cord that has flexibility is used as the core material 20. For example, leather (natural leather, synthetic leather) or cloth (textile, knitting, nonwoven fabric) is used as the welt surface material 21.

When the welt surface material 21 is folded in two, and sewed together with sewing regions 10a, 11a of the surface materials 10, 11, the welt surface material is formed into a pipe which extends along the seam of the surface materials 10, 11. The welt 12 is constructed by inserting the core material 20 through the pipe formed of the welt surface material 21.

The welt 15 of the trim cover 6 is also constructed similarly.

Figure 3:
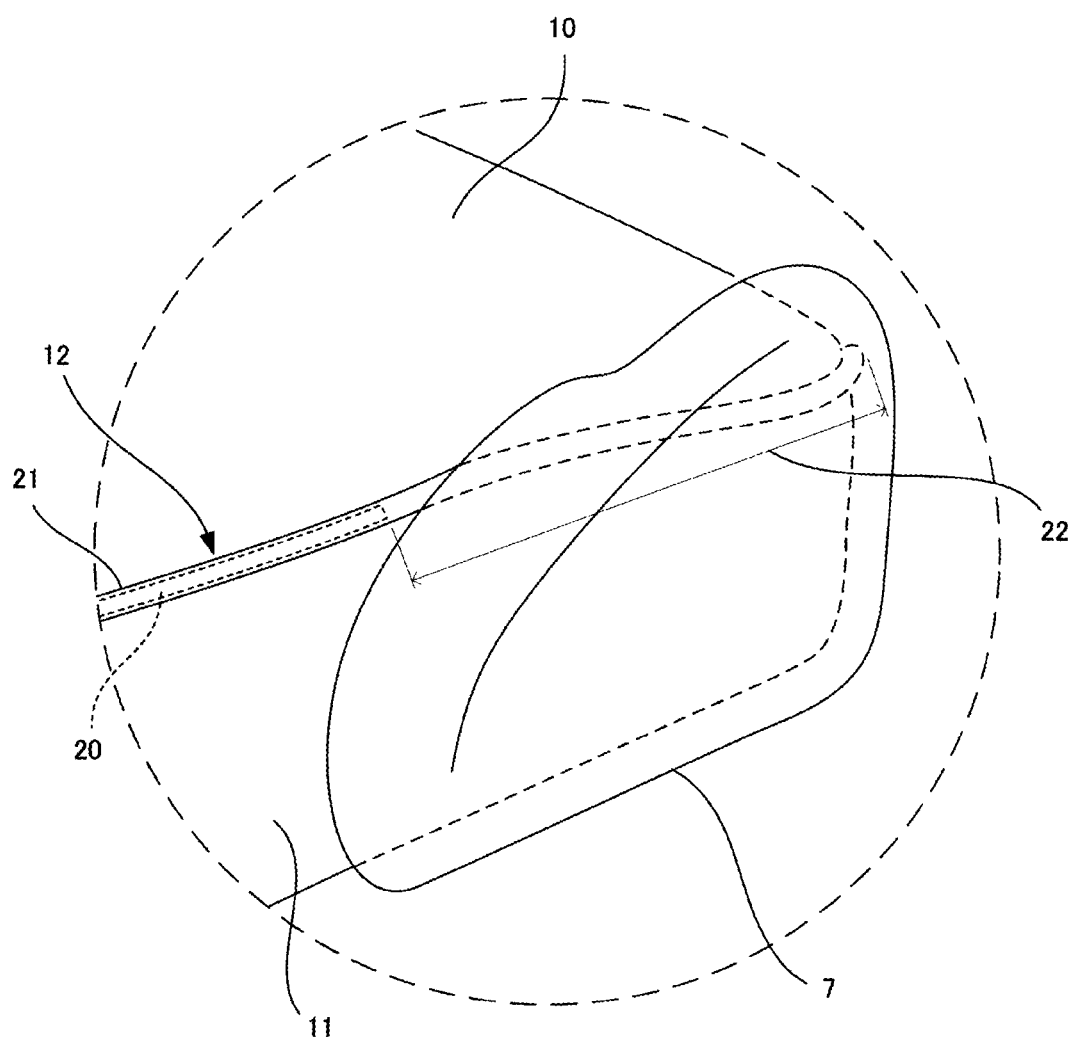
FIG. 3 is an enlarged perspective view of the trim cover of a seat cushion in an area surrounded by the dashed circle III of FIG. 1.

FIG. 3 shows a detailed configuration of the welt 12 of the trim cover 5.

A side of the seat cushion 2 is covered by a side finish 7 made of synthetic resin. The side finish 7 is overlapped on a part of the end side of the welt 12. The welt 12 is provided with an empty core part 22 which reaches one end of the welt 12, and the side finish 7 is overlapped on the empty core part 22. The empty core part 22 refers to such a part where the core material 20 is not received inside the pipe formed of the welt surface material 21, and only the welt surface material 21 is included.

With the sitting and leaving of a passenger, contact and separation between the empty core part 22 and the side finish 7 are repeated, but because the core material 20 is not received in the empty core part 22, and the welt surface material 21 is not sandwiched between the core material 20 and the side finish 7 in the case of contact with the side finish 7, the load that is applied to the welt surface material 21 is reduced. Thereby, a tear of the welt surface material 21 can be prevented.

Figure 4:
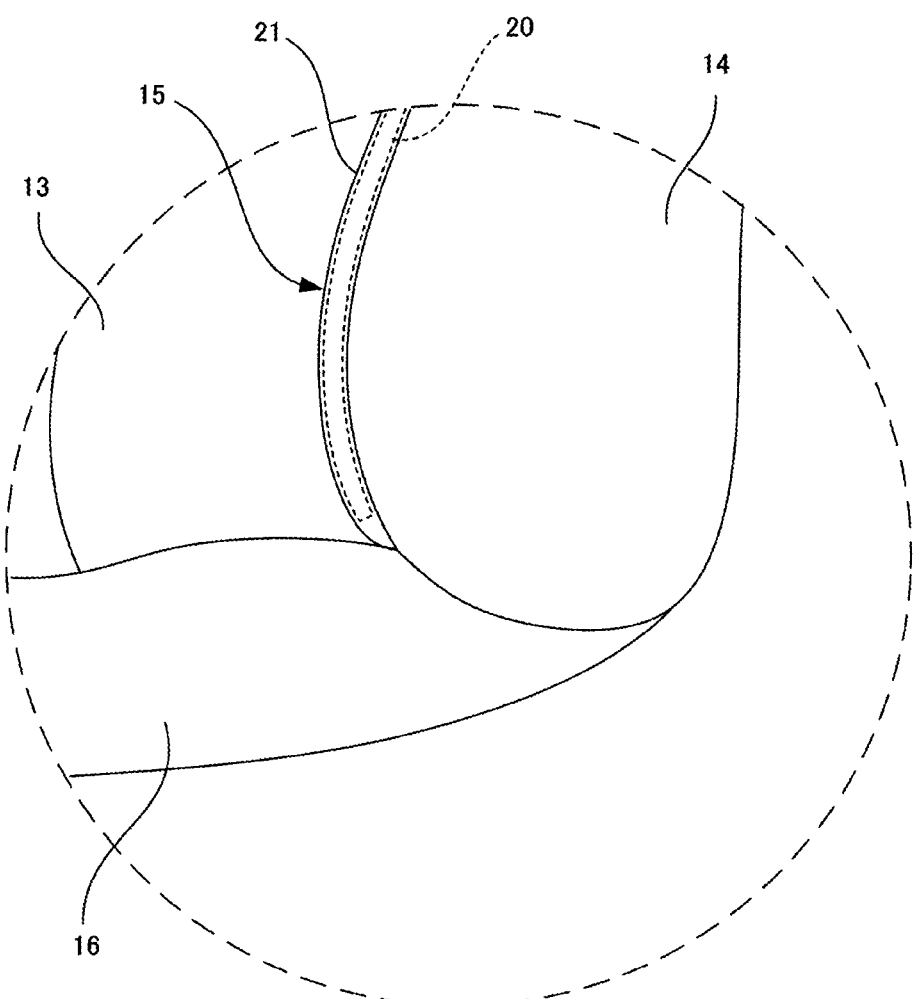
FIG. 4 is an enlarged perspective view of the trim cover of a seat pack in the area surrounded by the dashed circle III of FIG. 1.
Figure 5:
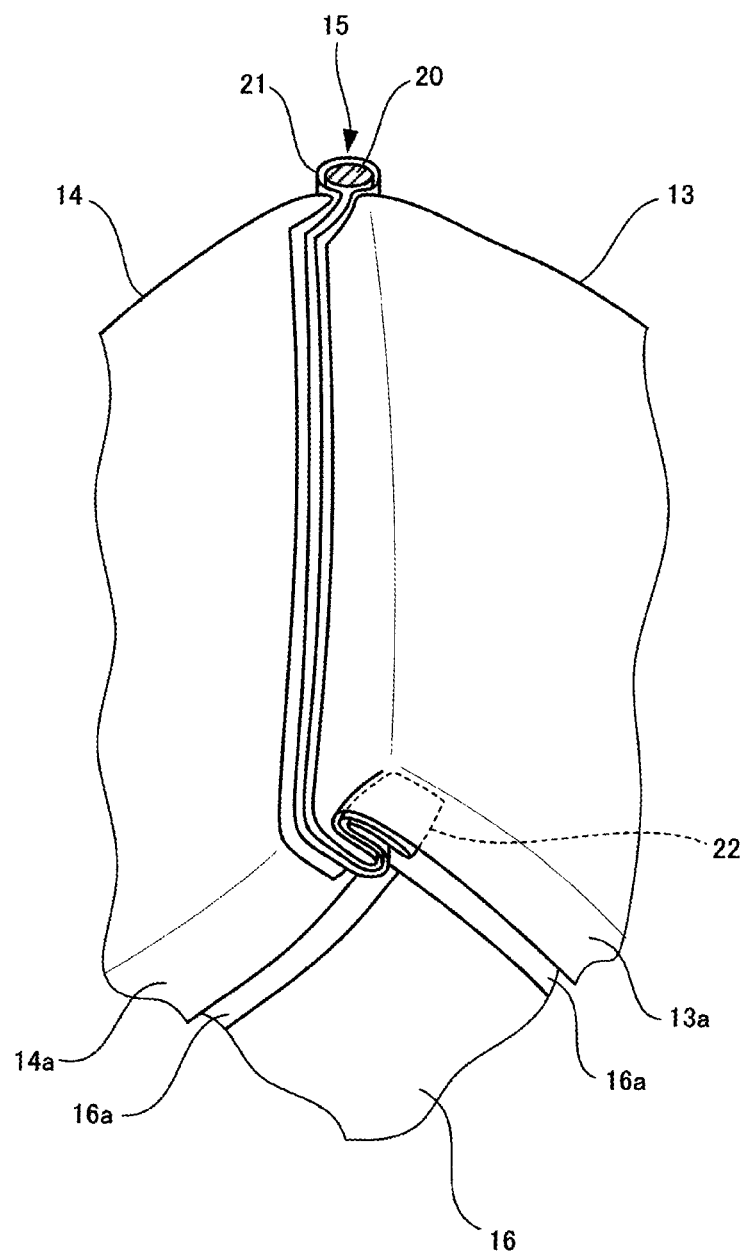
FIG. 5 is a perspective view of the base side of the trim cover of FIG. 4.

FIGS. 4 and 5 show a detailed configuration of the welt 15 of the trim cover 6.

The surface material 13 that forms the back surface of the seat pack 3 and the surface material 14 that forms the side surface of the seat pack 3 are joined with a surface material 16 that forms a lower end surface of the seat pack 3, and sewing regions 13a, 14 of the surface materials 13, 14 and a sewing region 16a of the surface material 16 are overlapped and sewed together.

A part at the end side of the welt 15 provided along the seam of the surface materials 13, 14 is overlapped and sewed together with the sewing regions 13a, 14a of the surface materials 13, 14, and the sewing region 16a of the surface material 16. The welt 15 is provided with an empty core part 22 which reaches one end of the welt 15, and the empty core part 22 and the sewing region 16a are overlapped and sewed together.

Because the core material 20 is not received in the empty core part 22, and when sewed with the sewing region 16a, the welt surface material 21 is not sandwiched between the core material 20 and sewing thread, the load applied to the welt surface material 21 is reduced. Thereby, a tear of the welt surface material 21 can be prevented. Because a sewing needle does not need to be pierced into the core material 20 which is relatively rigid, sewing becomes easy and the sewing quality of the trim cover 6 can be stabilized.

What is claimed is:

1. A vehicle seat comprising:
   a trim cover including: a plurality of surface materials joined to each other;
   a welt provided on the trim cover, the welt being provided along a seam of two pieces of joined surface materials, the welt including:
      a part where a welt surface material wraps a core material; and
      an empty core part where the core material is not received, the empty core part reaching one end of the welt; and
   a seat element overlapped on the empty core part.

2. The vehicle seat according to claim 1, wherein:
   the welt is provided along a seam of a surface material which forms a bearing surface of a seat cushion and a surface material which forms a side surface of the seat cushion; and
   the seat element is a side finish which covers the side surface of the seat cushion.

3. The vehicle seat according to claim 1, wherein
   the seat element is another surface material which is joined with the two pieces of joined surface materials.

* * * * *